(12) United States Patent
Weant et al.

(10) Patent No.: US 6,411,206 B1
(45) Date of Patent: Jun. 25, 2002

(54) BRAKE MONITORING SYSTEM

(75) Inventors: Bob R. Weant, Rock Hill, SC (US); Alan C. Lesesky, Charlotte, NC (US); Graydon Choinski, Harrisburg, NC (US); Richard Rink; Henry T. Dangson, both of Charlotte, NC (US)

(73) Assignee: Indian Head Industries, Inc., Charlotte, NC (US)

( * ) Notice: Subject to any disclaimer, the term of this patent is extended or adjusted under 35 U.S.C. 154(b) by 0 days.

(21) Appl. No.: 09/516,304

(22) Filed: Feb. 29, 2000

Related U.S. Application Data

(63) Continuation of application No. 09/091,057, filed as application No. PCT/US97/18846 on Oct. 14, 1997.
(60) Provisional application No. 60/027,706, filed on Oct. 11, 1996.

(51) Int. Cl.[7] .................................................. B60Q 1/44
(52) U.S. Cl. ...................... 340/479; 340/453; 340/454; 188/1.11 E; 188/1.11 W
(58) Field of Search ................................ 340/453, 454, 340/450.1, 479; 188/1.11 E, 1.11 W

(56) References Cited

U.S. PATENT DOCUMENTS

| | | | |
|---|---|---|---|
| 1,302,928 A | 5/1919 | Jay Jr, et al. ................ 137/411 |
| 2,183,700 A | 12/1939 | Sinclair ........................ 137/411 |
| 2,554,065 A | 5/1951 | Shields ........................ 73/129 |
| 2,873,436 A | 2/1959 | Avrea ........................ 188/99.55 |
| 3,571,800 A | 3/1971 | Taylor ........................ 340/453 |
| 3,622,926 A | 11/1971 | Risk ............................ 307/413 |
| 3,654,549 A | 4/1972 | Maurer et al. ............... 335/205 |
| 3,776,329 A | 12/1973 | Hope et al. ............. 324/207.16 |
| 3,808,593 A | 4/1974 | Kopernik et al. ....... 188/1.11 R |
| 3,845,430 A | 10/1974 | Petkewicz et al. ........... 340/454 |
| 4,013,143 A | 3/1977 | Juhasz .................... 188/1.11 R |
| 4,279,214 A | 7/1981 | Thorn ......................... 116/208 |
| 4,364,011 A | 12/1982 | Bloomfield et al. ......... 324/174 |
| 4,468,650 A | 8/1984 | Barbee ........................ 346/58 |
| 4,471,304 A | 9/1984 | Wolf ..................... 324/207.24 |
| 4,476,449 A | 10/1984 | Gray et al. .................. 335/138 |
| 4,583,071 A | 4/1986 | Sebalos et al. ............. 340/453 |
| 4,642,603 A | 2/1987 | Martinez, Jr. ............... 340/453 |
| 4,649,370 A | 3/1987 | Thomason .................. 340/453 |
| 4,674,338 A | 6/1987 | Carpenter ................... 340/453 |
| 4,749,063 A | 6/1988 | Garrett et al. ........... 73/861.77 |
| 4,757,300 A | 7/1988 | Sebalos ................. 188/1.11 E |
| 4,800,991 A | 1/1989 | Miller .................... 188/1.11 L |
| 4,855,712 A | 8/1989 | Wiley, Jr. et al. ........... 340/453 |
| 4,883,150 A | 11/1989 | Arai ............................ 188/289 |
| 4,914,916 A | 4/1990 | Leigh-Monstevens et al. ......... 60/534 |
| 4,937,554 A | 6/1990 | Herman ....................... 340/453 |
| 4,989,537 A | 2/1991 | Hutchinson, Sr. et al. .. 116/208 |
| 5,044,302 A | 9/1991 | Goldfein et al. ............ 116/208 |
| 5,087,907 A | 2/1992 | Weiler et al. ............... 340/454 |
| 5,140,932 A | 8/1992 | Goldfein et al. ............ 116/208 |

(List continued on next page.)

FOREIGN PATENT DOCUMENTS

| | | |
|---|---|---|
| DE | 1245190 | 3/1965 |
| GB | 2232770 | 3/1990 |
| JP | 62286816 | 12/1987 |
| JP | 63255114 | 10/1988 |

*Primary Examiner*—Daryl Pope
(74) *Attorney, Agent, or Firm*—Howard & Howard

(57) ABSTRACT

A brake monitoring system generally includes a plurality of brake monitors mounted on each of a plurality of brake actuators. Each brake monitor generally comprises a sleeve mounted to a push rod which moves relative to a stone shield on the brake actuator. The displacement of the sleeve relative to the stone shield is measured to determine the stroke of the brake actuator. This information is sent via an RF transmitter to a controller which determines the condition of each of the brakes.

10 Claims, 10 Drawing Sheets

U.S. PATENT DOCUMENTS

| | | | |
|---|---|---|---|
| 5,178,092 A | 1/1993 | Schedin | 116/208 |
| 5,213,056 A | 5/1993 | Nicholls et al. | 116/208 |
| 5,226,509 A | 7/1993 | Smith | 188/1.11 W |
| 5,253,735 A | 10/1993 | Larson et al. | 188/1.11 L |
| 5,266,917 A | 11/1993 | Bleeke et al. | 338/324 |
| 5,285,190 A | 2/1994 | Humphreys et al. | 340/453 |
| 5,302,939 A | 4/1994 | Downs et al. | 340/447 |
| 5,320,198 A | 6/1994 | Hoyt et al. | 188/1.11 W |
| 5,322,641 A | 6/1994 | Shiel et al. | 252/514 |
| 5,339,069 A | 8/1994 | Penner et al. | 340/454 |
| 5,358,075 A | 10/1994 | Jarzombek | 188/1.11 L |
| 5,394,137 A | 2/1995 | Orschek | 340/453 |
| 5,433,296 A | 7/1995 | Webberley | 188/1.11 L |
| 5,450,930 A | 9/1995 | Martens | 188/1.11 L |
| 5,472,539 A | 12/1995 | Saia et al. | 156/155 |
| 5,535,854 A | 7/1996 | Prince | 188/1.11 R |
| 5,545,368 A | 8/1996 | Vinarcik | 264/437 |
| 5,572,187 A | 11/1996 | Williford | 340/454 |
| 5,825,287 A * | 10/1998 | Zarybnicky et al. | 340/453 |

\* cited by examiner

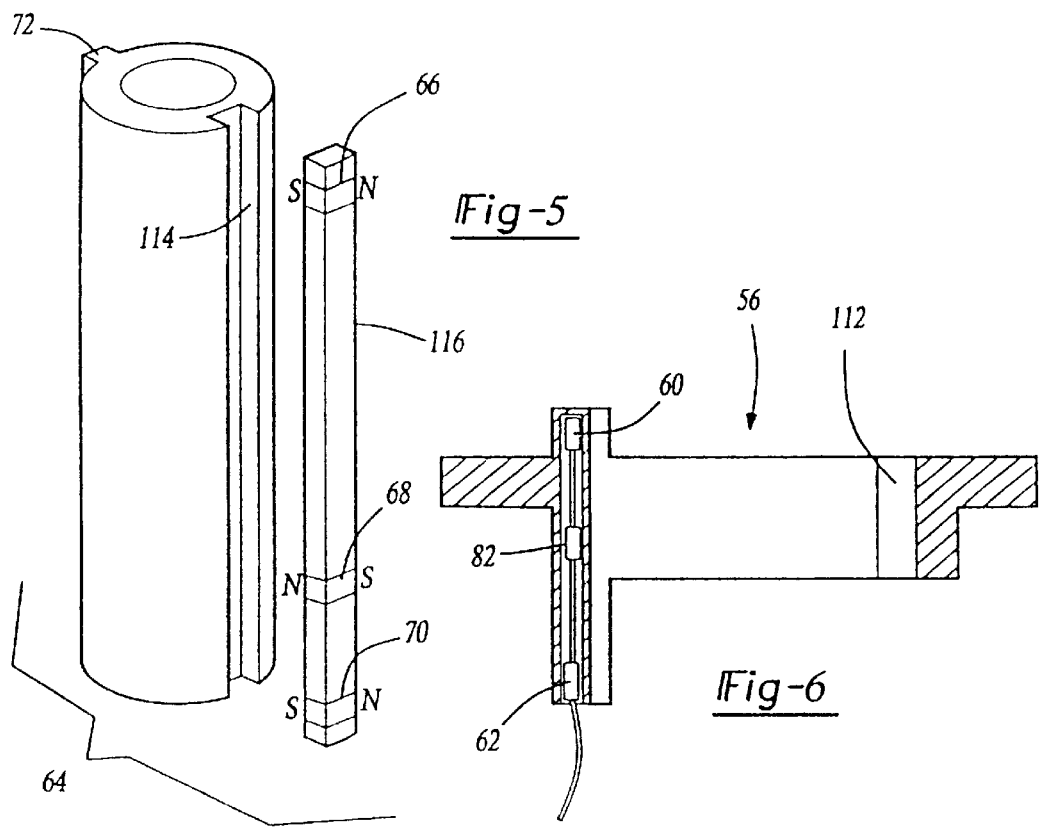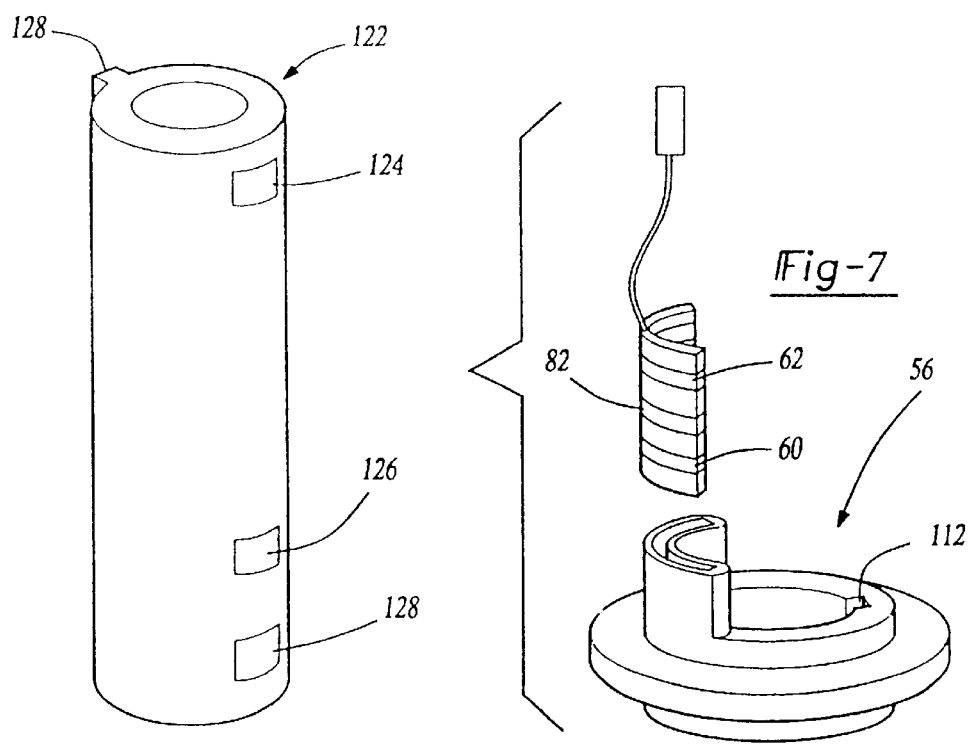

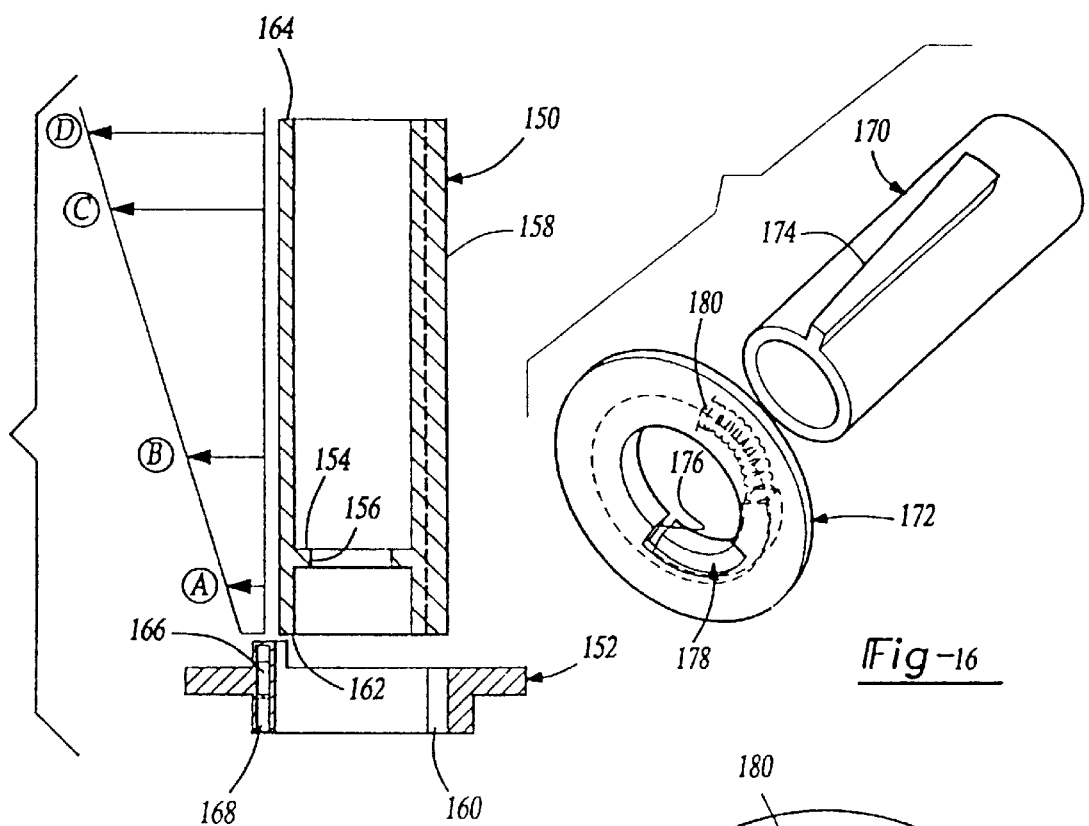
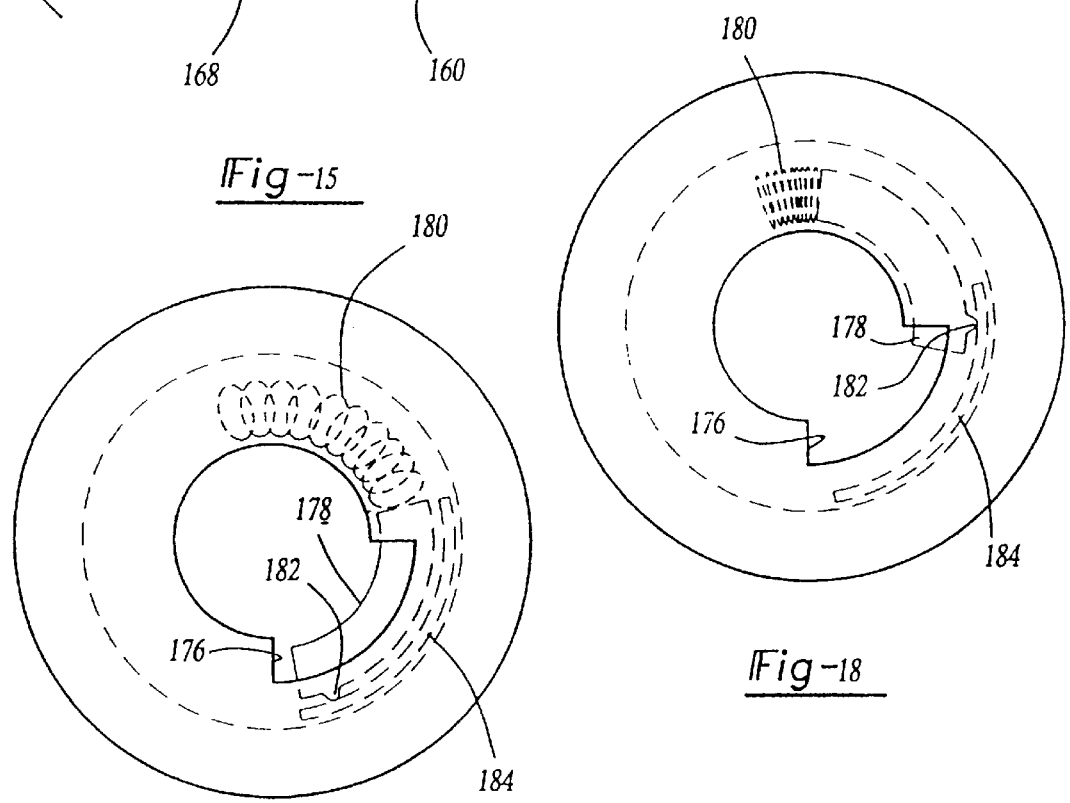
Fig-15
Fig-16
Fig-17
Fig-18

BRAKE MONITORING SYSTEM

RELATED APPLICATIONS

This application is a continuation of co-pending application Ser. No. 09/091,057 filed Nov. 30, 1998, and claims the benefit of PCT/US97/18846 filed Oct. 14, 1997, and provisional application Ser. No. 60/027,706 filed Oct. 11, 1996.

BACKGROUND OF THE INVENTION

The present invention relates to an improved brake monitoring system, particularly for use on vehicles such as a tractor and trailer combination.

In the prior art, heavy duty trucks and other large vehicles are typically equipped with an air brake actuating system. The air brake actuating system applies air to a service chamber to move a diaphragm in a first direction. A push rod typically moves with the diaphragm, and the push rod is connected to a linkage that actuates the vehicle brakes. An emergency chamber is generally also attached adjacent to the service chamber, and is operable to move the push rod in the event that the air system fails. To this end, a high strength power spring is typically incorporated into the emergency chamber to actuate the push rod when there is a failure in the system air line. This spring also typically actuates the push rod when the vehicle is parked.

A brake actuator has a predetermined amount of available movement, or stroke, for the push rod. The amount of movement of the push rod required to fully actuate the brakes must be carefully monitored such that it is within the stroke of the brake actuator. The prior art has experienced situations wherein there has been an excessive amount of push rod movement for actuation of the brake system. This excessive required push rod movement can be created by any one of several factors. Typically, excessive movement is due to brake lining wear. As the brakes wear, more movement of the push rod is required to actuate the brakes. Further, as the linkages, connections, etc. between the members connecting the push rod to the brakes bend or become loose or excessively worn, additional push rod movement may be required to adequately stroke the brake. A combination of these several features may sometimes cause the amount of push rod movement required to actuate the brakes to approach the available push rod movement, or stroke, from the brake actuator. This is, of course, an undesirable situation.

The prior art has attempted to monitor the amount of push rod movement during actuation of the brake, and provide some indication to an operator of when there is excessive push rod movement. The determination of when there is excessive push rod movement is dependent upon the designed stroke, or rated stroke, of the brake actuator. In addition, an apparatus known as a slack adjuster is typically placed between the push rod and the foundation brake. The slack adjuster is incrementally adjusted to compensate for slack in the braking system and to decrease the required push rod movement. Automatic slack adjusters are now available which automatically adjust the foundation brake system.

Electronic indicator systems have been proposed. However, there are several obstacles to overcome. First, powering and monitoring electronic indicators on each of the brake actuators on an 18-wheel vehicle is costly. The cost in wiring alone for the vehicle exceeds the cost of all the electronic indicators and monitoring equipment combined. Further, the hostile environment in which the brake actuators are mounted can damage the wires connecting the brake actuators to a controller.

Further, there are numerous configurations for the tractors as well as the trailers. For example, the number of axles on tractors and trailers can vary. Each axle may include a spring brake actuator or just a service brake actuator. For efficiency, it would be desirable to have a single electronic controller which could be permanently programmed to recognize the specific configuration of the vehicle on which it is installed.

SUMMARY OF THE INVENTION

The present invention provides a brake monitoring system including a plurality of brake monitors mounted on each of a plurality of brake actuators on a vehicle. Each of the brake monitors includes at least one magnet and a magnet sensing device which move relatively during brake actuation, and move increasingly as the brake wears. The brake monitoring system further includes a controller receiving a signal from each of the magnet sensing devices, a brake signal indicating when the brake actuator is activated by a driver and pressure signals from each of the brake actuators indicating when air pressure in each brake actuator reaches a predetermined level. Each brake monitor further includes an RF transmitter which periodically transmits the condition of the brake actuator to the controller.

Each magnet is preferably formed on a generally hollow cylindrical sleeve which is mounted to a push rod in the brake actuator. As the push rod is actuated, the sleeve moves relative to a plurality of switches embedded in a stone shield in the brake actuator. As the brake actuator is actuated, the sleeve moves relative to the magnetic sensing device, thereby generating a signal indicative of the displacement of the push rod.

In one embodiment, the sleeve includes a plurality of magnets secured to the sleeve. In other embodiments, the sleeve comprises particles in a nylon matrix. Portions of the sleeve are selectively magnetized or the sleeve is magnetized from one axial end to the other axial end. The magnetization of the sleeve at one axial end is high and decreases linearly to the opposite axial end. A hall effect device mounted in the stone shield detects the level of the magnetic field and determines the displacement of the push rod accordingly.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 5 is a perspective partially exploded view of the sleeve in FIG. 2;

FIG. 6 is a sectional view of the stone shield of FIG. 2;

FIG. 7 is an exploded perspective view of the stone shield of FIG. 6;

FIG. 8 is a perspective view of an alternate sleeve which could be used in the brake actuator of FIG. 2;

FIG. 15 is a sectional view of a second alternate sleeve and an alternate stone shield which could be utilized in the brake actuator of FIG. 2;

FIG. 16 is a perspective exploded view of a third alternate sleeve and stone shield which could be utilized in the brake actuator of FIG. 2;

FIG. 17 is an end view of the stone shield of FIG. 16 in a first position;

FIG. 18 is the stone shield of FIG. 16 in a second position.

DETAILED DESCRIPTION OF A PREFERRED EMBODIMENT

Figure 1:
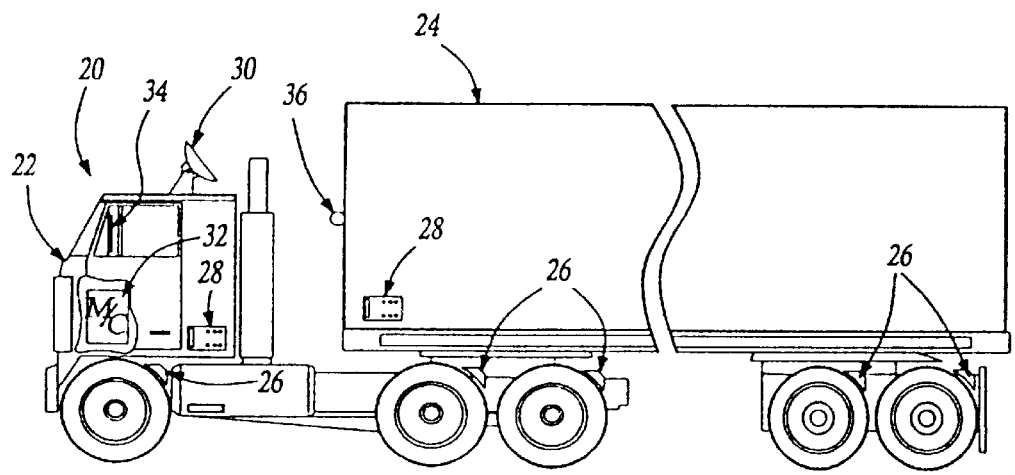
FIG. 1 is a schematic view of the brake monitoring system of the present invention installed on a tractor and trailer combination.

A brake monitoring system 20 according to the present invention is for use on vehicles such as a tractor 22 and trailer 24. The tractor 22 and trailer 24 each include a plurality of brake actuators 26 which operate the brakes of a vehicle in a well-known manner. A controller 28 is installed on each of the tractor 22 and trailer 24 for monitoring the brake actuators 26. Preferably, each of the controllers 28 is in communication with a satellite antenna 30, the vehicle micro-controller 32 for the tractor 22, a heads up display 34 in the tractor 22. Further, the controller 28 installed on the trailer 24 is connected to a tri-color LED 36 which is installed on the front of the trailer 24 to be visible in the rearview mirror of the tractor 22. Preferably, the LED 36 is a tri-color LED 36 which indicates green, yellow, or red indicating that the brakes on the trailer 24 are in a safe condition, in need of adjustment, or in a dangerous condition, respectively.

All of the information from both controllers 28 regarding the operation of all of the brake actuators 26 is communicated to the driver on the heads-up display 34. Further, all of the information from both controllers 28 is communicated via the satellite antenna 30 to a central location, such as the dispatching location of the tractor 22 and trailer 24. Further, information from controllers 28 is communicated via a vehicle bus to the vehicle micro-controller 32. Additionally, information from controllers 28 can be relayed via radio signals or similar means to operators of vehicle weigh stations, in a manner similarly proposed for communicating the weight of the vehicle during a drive by. Further, the LED 36 is visible to the weigh station operators, as well as other vehicles on the road, such as police cars.

Figure 2:
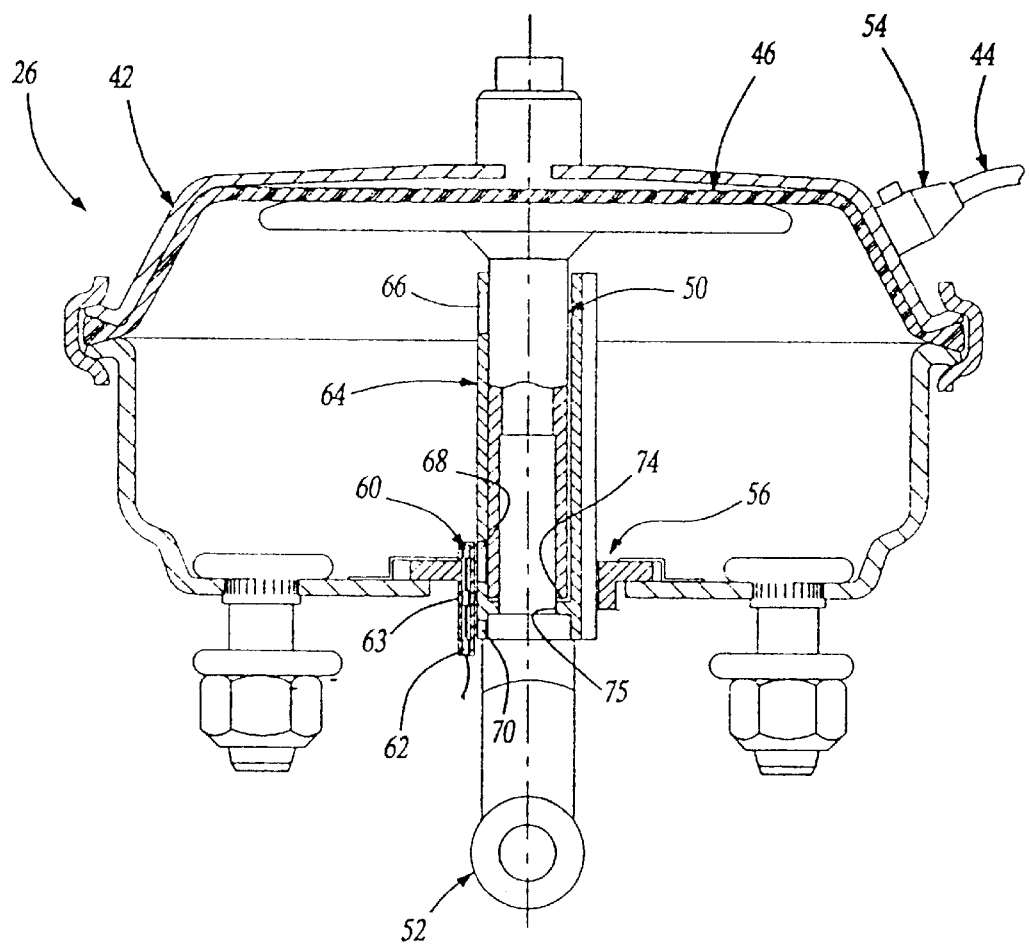
FIG. 2 is a sectional view of a brake actuator of FIG. 1.

Referring to FIG. 2, each of the brake actuators 26 includes a service chamber 42. As is well known, air pressure through air line 44 into the service chamber 42 causes downward movement of diaphragm 46 as well as push rod 50 and yoke 52 to thereby actuate the brake. A pressure switch 54 measures the air pressure in service chamber 42 and air line 44. Preferably, pressure switch 54 is switched on at 6 PSI. A plastic molded stone shield 56 is mounted in the service chamber 42. The push rod 50 extends and retracts through stone shield 56. The stone shield 56 includes a plurality of switches, preferably an upper switch 60 and a lower switch 62. The switches 60, 62 are magnetically actuated switches, such as reed switches or Hall effect switches, which are well known to those in the relevant art. Generally, these types of magnetically operated switches are either normally opened and normally closed, and is switched when in proximity of a magnetic field. Preferably, the switches 60, 62 are normally open switches which are closed in the proximity of sufficient magnetic field.

Although each of the switches 60, 62 from each of the brake actuators 26 can be connected to the controller 28 via hard electrical wires, preferably, each brake actuator 26 includes at least one RF transmitter 63. This RF transmitter is preferably a single chip RF transmitter 63 which can be embedded in the stone shield 56 between the switches 60, 62. The RF transmitter 63 may include a battery which has a useful life longer than that of the brake actuator 26. In order to extend battery life, the transmitter 63 may enter a "sleep" mode until an event occurs, i.e., one of the switches 60, 62, 54 changes state, at which it would transmit a signal. Alternatively, the RF transmitter 63 can be a passive transmitter, such as is known in the art. A passive RF transmitter 63 receives energy via a transmitted RF signal from the controller 28, or other source. A hand held receiver can also be utilized to receive the RF signals from the RF transmitters regarding the condition of the brake actuators.

Each brake actuator 26 preferably includes a generally hollow cylindrical sleeve 64, preferably comprising nylon 6,6. The sleeve 64 includes a plurality of magnets, including preferably an upper magnet 66, a middle magnet 68, and a lower magnet 70. It should be understood that the terms upper and lower with respect to the switches 60, 62 and magnets 66, 68, 70 are with respect to the figures only, as the brake actuators 26 may be oriented differently. Further, the sleeve 64 preferably includes a key 72 extending radially outwardly of the sleeve 64 and extending preferably axially along its entire length. The sleeve 64 further includes an inner wall 74 extending radially inwardly of the sleeve 64, forming an aperture 75. The sleeve 64 is slid onto push rod 50, until the inner wall 74 abuts push rod 50. Then the yoke 52 is threaded into push rod 50, until it abuts the inner wall 74, securely retaining the sleeve on the end of the push rod 50. It should be recognized that cylindrical spacers commonly utilized in the industry could also be inserted between yoke 52 and inner wall 74.

Figure 3:
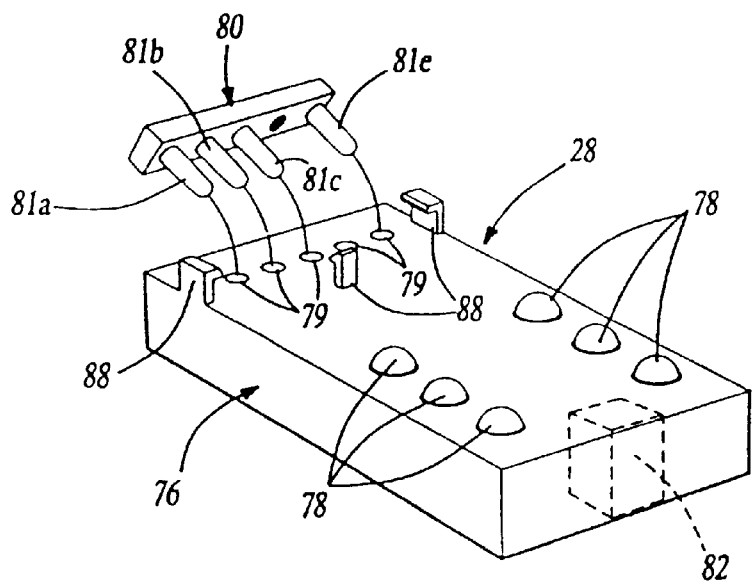
FIG. 3 is a perspective view of a controller of FIG. 1.

Referring to FIG. 3, each of the controllers 28 preferably includes a housing 76 which includes a plurality of LEDs 78, each LED corresponding to a brake actuator 26 on the tractor 22 or trailer 24. Each of the LEDs 78 is a tri-color LED and can be displayed steady or flashing, or in any combination of colors and steady or flashing. Each controller 28 preferably includes a plurality of sockets 79, preferably five for receiving a programming clip 80 having a plurality of pins 81–85, some of which are selectively broken-off and removed in order to program the controller 28 as will be described. The controller housing 76 preferably includes retainer clips 88 for retaining the programming clip 80 once the programming clip 80 is inserted into the socket 79. Preferably, once inserted, the programming clip 80 cannot be removed from the controller housing 76, without causing visible damage to the retainer clip 88 or housing 76. Alternatively, sockets 79 can be disposed in a connector connected to the controller 28 by a plurality of wires.

Figure 3A:
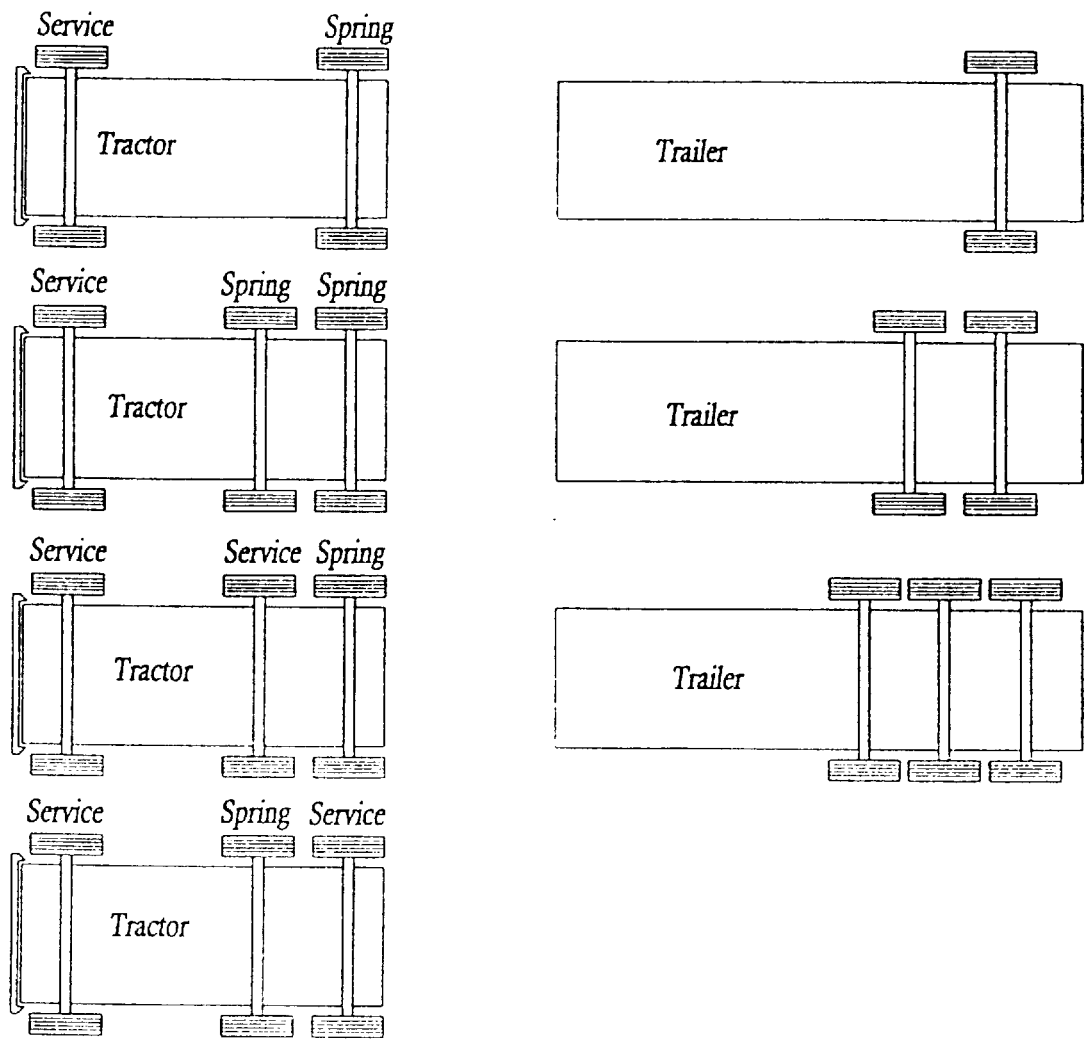
FIG. 3A is a programming chart for the controller of FIG. 3.

In order to provide a controller 28 which is usable for a variety of configurations, including installation on either a tractor 22 or trailer 24, the programming clip 80 is permanently inserted into the socket 79 to program the controller 28 as to the number and types of brake actuators 26 installed on the vehicle, and whether the vehicle is a tractor 22 or a trailer 24. FIG. 3A shows one way of utilizing three of the pins 81–85 to program a controller 28. For example, pin 1 81 can indicate whether a controller 28 is installed on a tractor 22 or a trailer 24. Other pins can indicate how many axles the vehicle has and whether those axles include spring brakes or service brakes. If a pin is inserted in a socket 79, a connection is made between that input to the controller 28 and a ground, thereby indicating to the controller that the pin was inserted into the socket 79. On the other hand, if the pin is broken off, the socket 79 remains an open circuit, thereby indicating to the controller 28 that the pin was broken. In this manner, the programming clip 80 can provide a permanent, non-removable method for programming the controller 28. The controller 28 further includes an RF receiver 82 for receiving signals from each of the RF transmitters 63 on each of the brake actuators 26 (FIG. 2).

Figure 4:
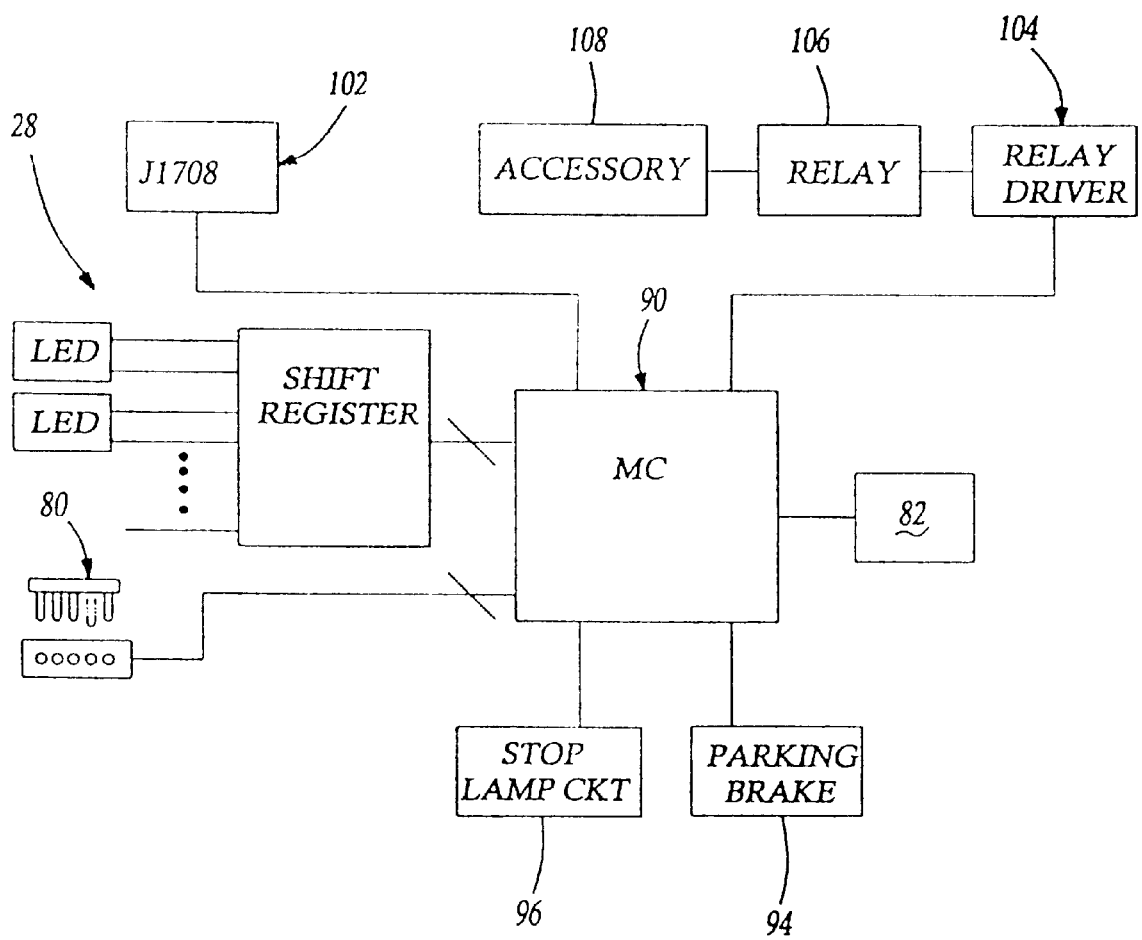
FIG. 4 is a schematic of the controller of FIG. 3.

FIG. 4 shows a schematic of the controller 28. The controller 28 generally includes a micro-controller 90 which is preferably a PIC17C42. The micro-controller 90 receives signals from all of the switches 54, 60, 62 via RF receiver 82 from all of the brake actuators 26 on the vehicle on which the controller 28 is installed. The micro-controller 90 receives an input from the parking brake circuit 94 which indicates when the driver of the vehicle has actuated the parking brakes. The micro-controller 90 includes an input from the stop lamp circuit 96, which indicates when the driver presses the brake pedal. The micro-controller 90 is connected via a bus to a shift register 98 which operates LEDs 78. Data indicating the condition of the brakes is processed in micro-controller 90 via software and output serially to the shift register 98 to operate LEDs 78 with the proper color and proper state, i.e. steady or flashing or off.

The micro-controller 90 includes an output to the vehicle bus 102, utilizing SAE communication standard J1708. The micro-controller 90 includes an output to a relay driver 104. The relay driver 104 is activated by the micro-controller 90 when there is a dangerous condition with the brakes. The relay driver 104 can be utilized to operate an external relay 106 (shown in phantom) to drive an accessory 108 (shown in phantom), such as a buzzer, additional light, etc.

Referring to FIG. 5, the sleeve 64 is preferably a generally hollow cylinder comprising nylon 6,6. The sleeve 64 further includes an axially-extending groove 114 into which a magnetic trip 116 is inserted. The magnetic strip 116 preferably comprises a magnetic material such as iron and includes three magnetized portions forming the upper magnet 66, middle magnet 68, and lower magnet 70. As shown in FIG. 5, the polarity of the magnets 66, 68, 70 are preferably alternating, in order to provide distinguishable magnetic fields for each magnet 66, 68, 70.

Referring to FIG. 6, the stone shield 56 preferably includes the upper switch 60, the lower switch 62, and the RF transmitter 82. Further, the stone shield preferably includes a keyway 112 diametrically opposed to the switches 60, 62.

Referring to FIG. 7, the stone shield 56 preferably includes a keyway 112 which is complementary to the key 72 on the sleeve 64. The key 72 and keyway 112 insure that the magnets 66, 68, 70 are aligned with the switches 60, 62.

Figure 9:
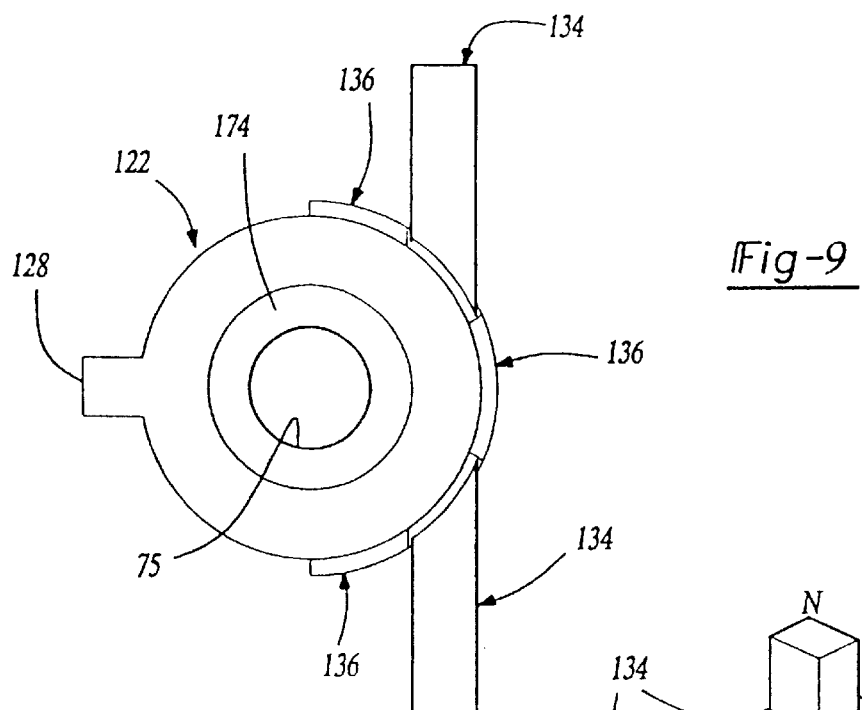
FIG. 9 is an end view of the sleeve of FIG. 8 being magnetized.
Figure 10:
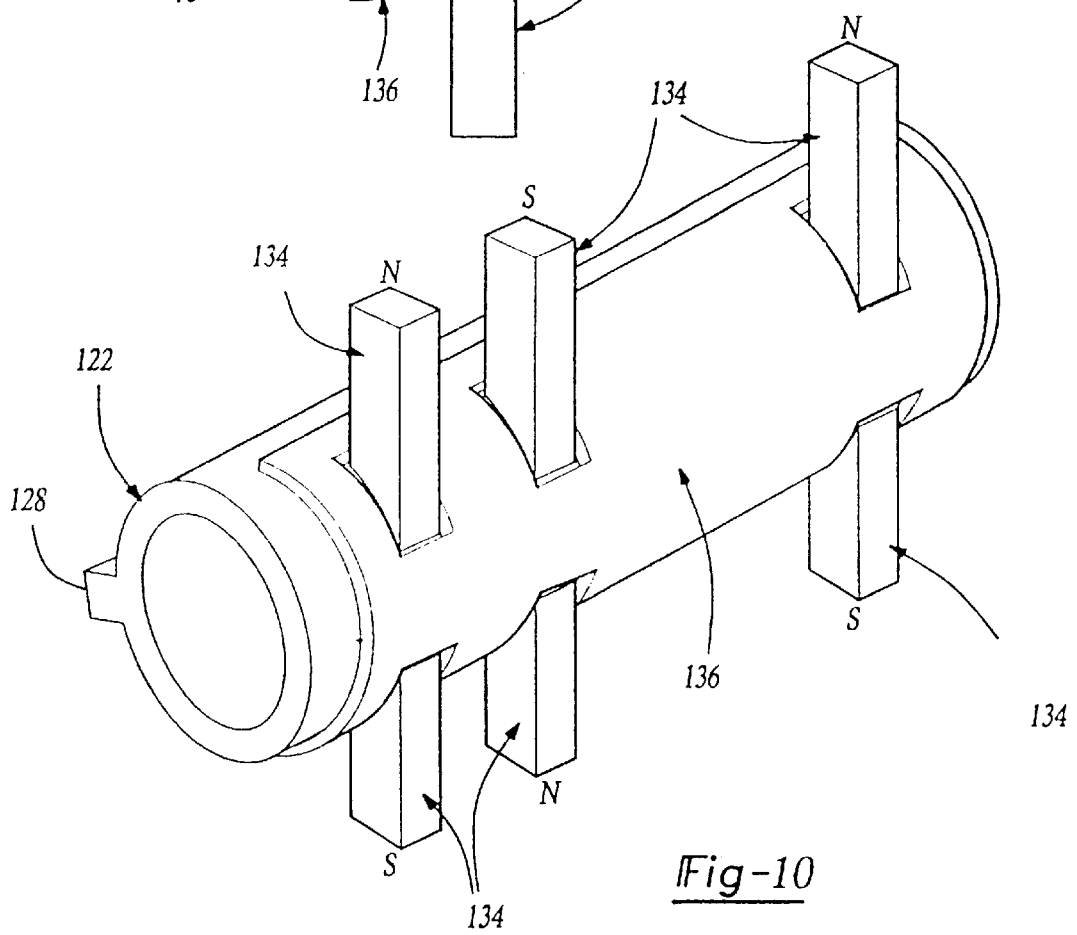
FIG. 10 is a perspective view of the sleeve and magnets of FIG. 9.

An alternate sleeve 122 is shown in FIG. 8. The alternate sleeve 122 preferably comprises ferrite particles in a nylon 6,6 matrix. The sleeve 122 is selectively magnetized to form upper magnet 124, middle magnet 126, and lower magnet 128. The sleeve 122 also includes a key 128 diametrically opposed to the magnets 124, 126, 128. As shown in FIG. 9, the sleeve 122 is selectively magnetized using a plurality of rare earth metal blocks 134. A magnetic field shield 136, generally comprising a metal, hollow half cylinder with a plurality of cut outs to form the magnetized portions is placed over the sleeve 122 to prevent other portions of the sleeve 122 from becoming magnetized. As can be seen in FIG. 10, the plurality of the magnets 124, 126, and 128 are preferably alternated to provide more distinguishable magnetic fields to be sensed by the magnetically operated switches 60, 62.

In one method for magnetizing the sleeve 112, the sleeve 112 would be secured to the push rod 50 and then extended from the service chamber 42 a predetermined distance. The rare earth metal blocks 134 are mounted on a tool which positions the magnetized portions 124, 126, 128 with respect to the bottom of the housing of the service chamber 42 on the brake actuator 26. This method precisely magnetizes the magnets 124, 126, 128 at the correct locations on the push rod 50.

Figure 11:
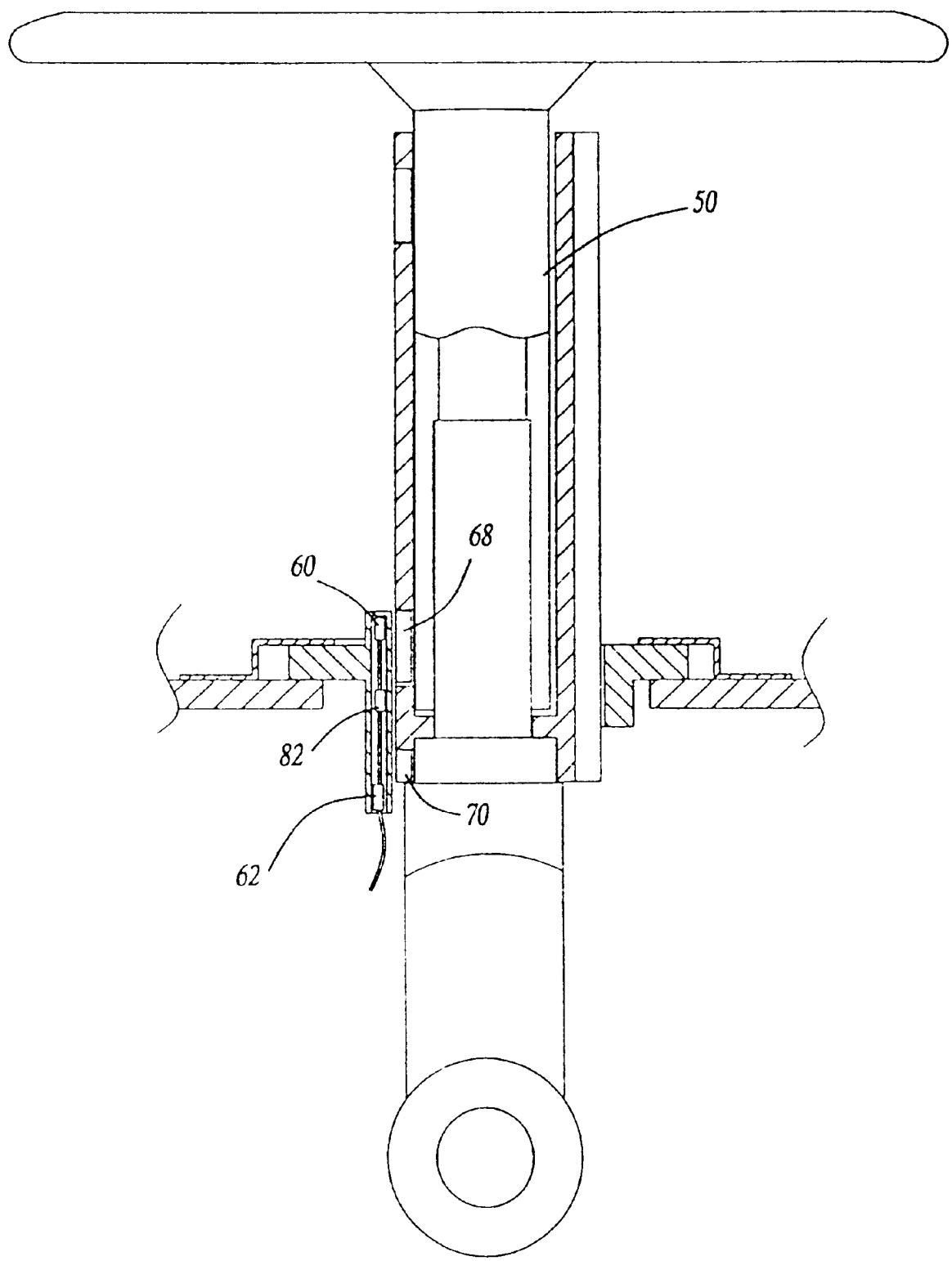
FIG. 11 is an enlarged view of the sleeve and stone shield of FIG. 2 in a first position.

In operation, referring to FIG. 11, when the push rod 50 is in its rest or "zero stroke" position, the middle magnet 68 is positioned adjacent the upper switch 60 and the lower magnet 70 is positioned adjacent the lower switch 62. In the zero stroke position, both switches 60, 62 are closed, indicating to the controller 28 that the push rod 50 is in the zero stroke position. Together with the inputs from the parking brake circuit 94, stop lamp circuit 96, and pressure switch 54, the controller 28 can determine whether a problem exists with the brake actuator 26. For example, if the parking brake circuit 94 or stop lamp circuit 96 indicate that the driver is attempting to apply the brakes, but the push rod 54 remains in the position shown in FIG. 11, the controller 28 will indicate after several seconds that an error has occurred in the brake actuator 26.

Figure 12:
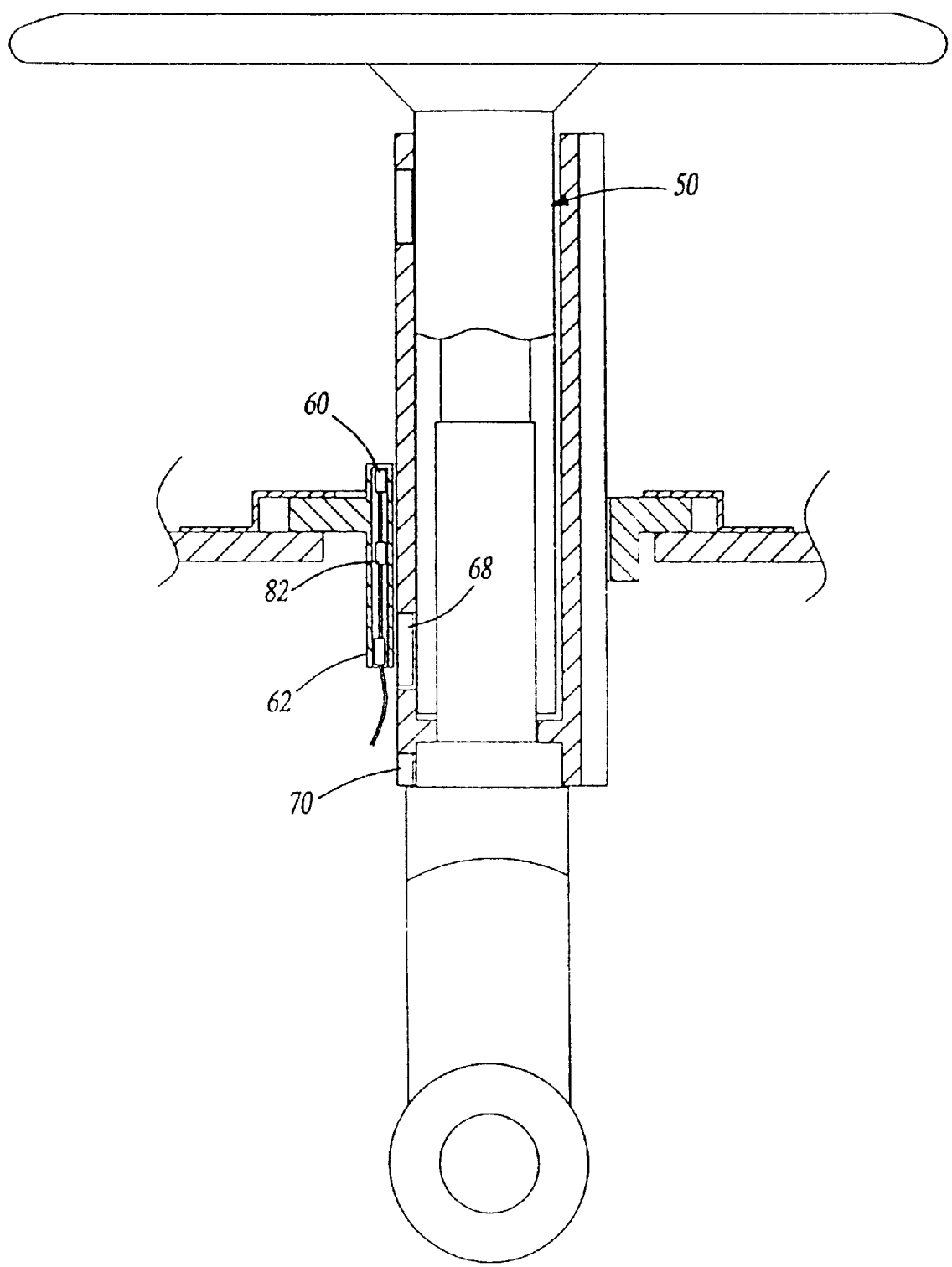
FIG. 12 is the sleeve and stone shield of FIG. 11 in a second position.

FIG. 12 shows the brake actuator in a ⅝" or 0.625" stroke condition. Preferably, the upper switch 60 and lower switch 62 are spaced by ⅝". It should be recognized that the exact spacing between the upper switch 60 and the lower switch 62 will depend upon the particular brake actuator 26 in which the brake monitoring system 20 is installed. In the preferred system, if the push rod 50 reaches a ⅝" stroke position, the upper switch 60 is open and the lower switch 62 is closed by the middle magnet 68. If the pressure switch 54 associated with that particular brake actuator 26 also indicates that the pressure in the service chamber 42 has not yet reached 6 PSI, and the stop lamp circuit 96 indicates that the driver is applying the brakes, the controller 28 indicates that the brakes are worn. If the brakes were not worn, the push rod 50 would meet sufficient resistance to raise the air pressure in the service chamber 42 above 6 PSI when the push rod 50 reached a ⅝" stroke position. This condition would then be indicated by the controller 28 to the LEDs, the heads-up display 34, the vehicle micro-controller 32 and the satellite antenna 30.

Further, if either upper switch 60 or lower switch 62 are open and neither the parking brake circuit 94 nor the stop lamp circuit 96 indicate that the brake should be applied, the controller 28 indicates to the various output devices that a dragging brake condition exists. Preferably, the controller 28 does not indicate a dragging brake condition until the condition exists for more than 20 seconds.

Figure 13:
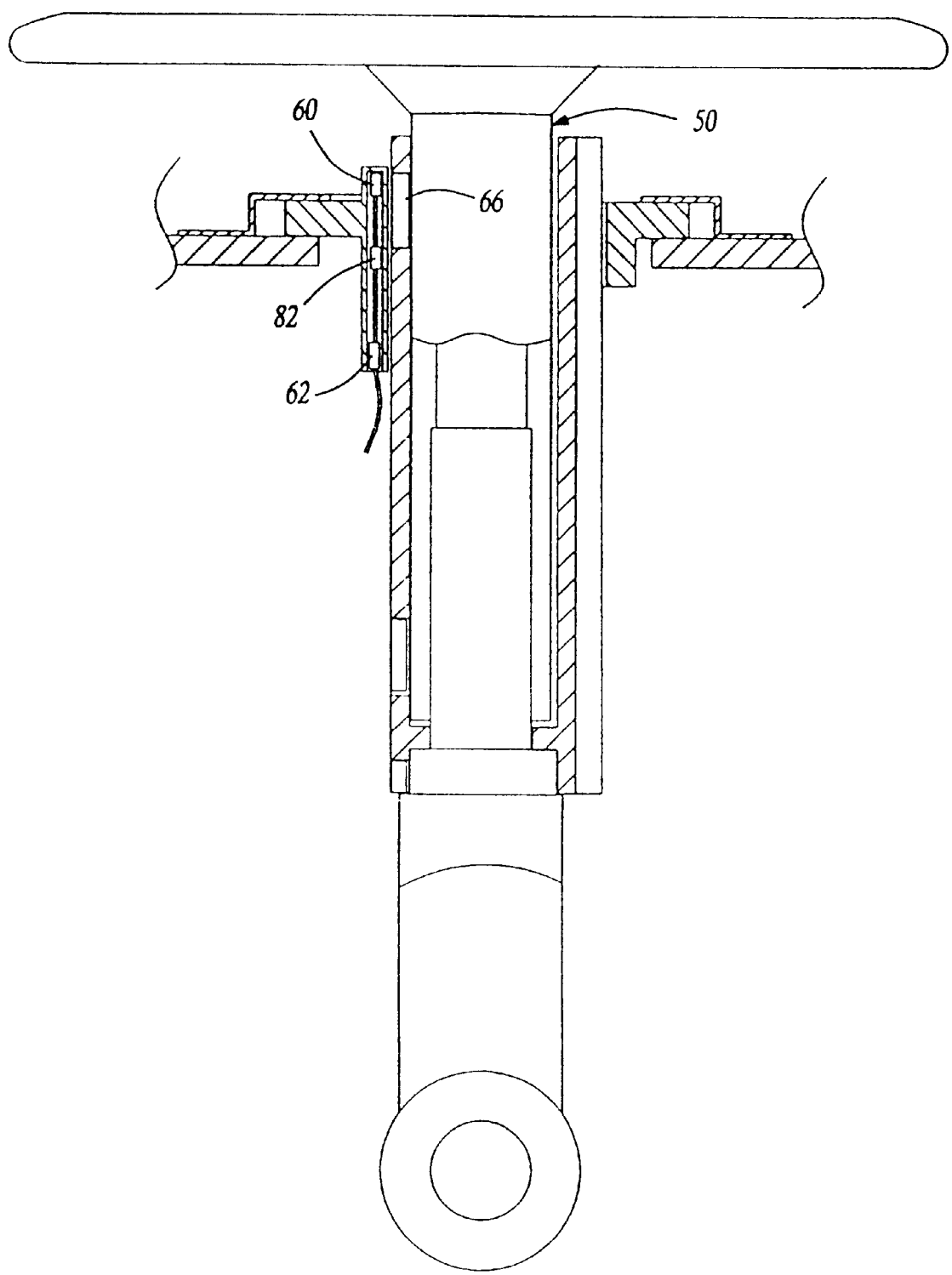
FIG. 13 is the sleeve and stone shield of FIG. 11 in a third position.

FIG. 13 indicates an overstroke condition, which is indicated to the controller 28 by the closure of the upper switch 60 while the lower switch 62 is open. This condition can only occur when the push rod 50 is extended sufficiently so that the upper magnet 66 switches on the upper switch 60. Preferably, the controller 28 does not indicate the overstroke condition unless the upper switch 60 is closed while the lower switch 62 is open for more than one second. It should be apparent that the distance between the middle magnet 68 and the upper magnet 66 will determine the stroke distance which will indicate an overstroke condition.

Figure 14:
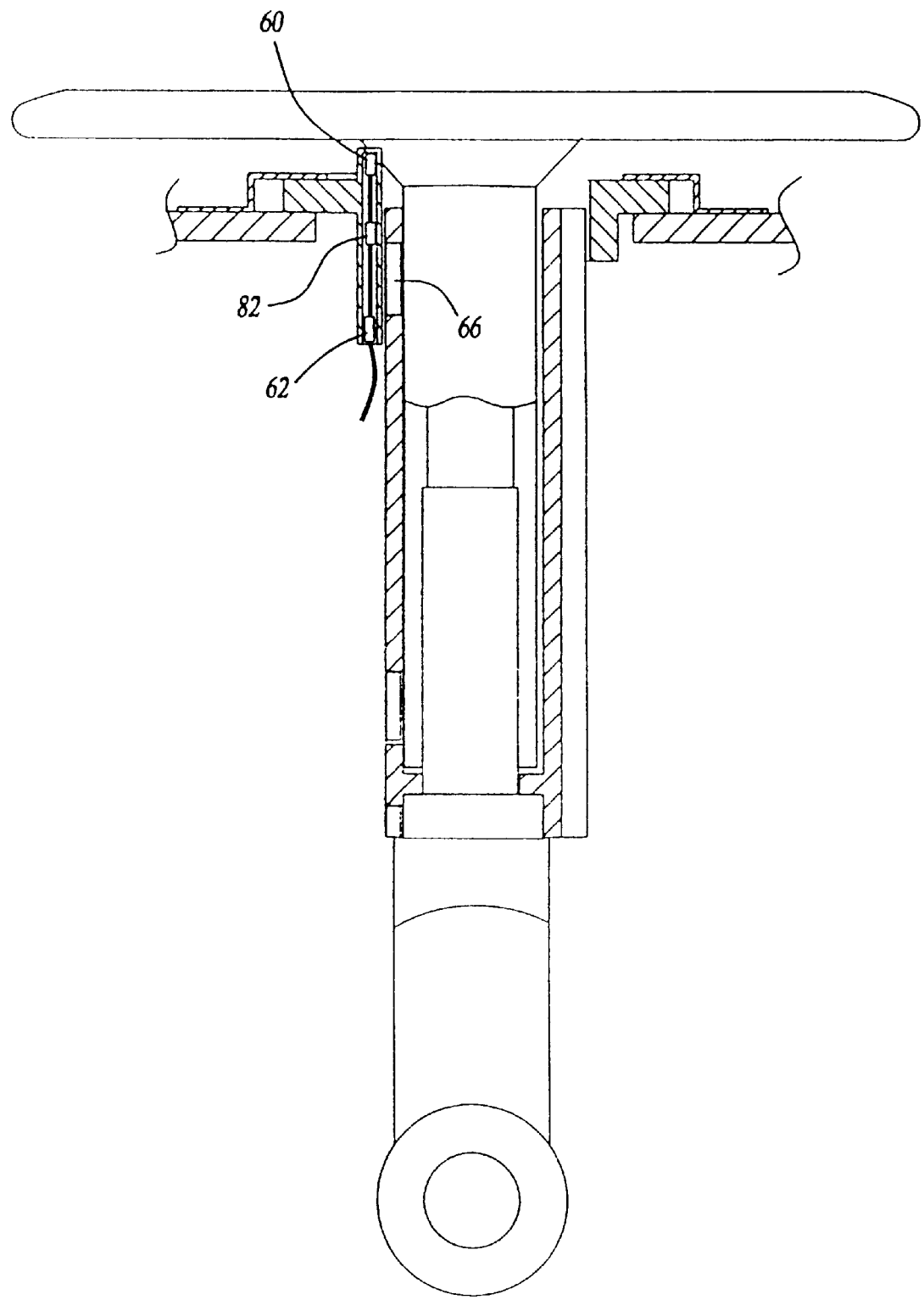
FIG. 14 is the sleeve and stone shield of FIG. 11 in a fourth position.

FIG. 14 shows a further overstroke condition, if the upper magnet 66 subsequently further closes the lower switch 62. This condition indicates a more serious overstroke condition to the controller 28.

Preferably, the controller 28 is programmed to latch any error which occurs, even if the error disappears subsequently. The controller 28 is then not reset until it is powered down, i.e. the ignition is switched off. This will insure that the error is displayed to the driver on the heads-up display 34, the LEDs 36, and the LEDs 78 long enough for the driver to notice. As an option, a non-volatile memory bank could be added to the micro-controller 90 in order to retain information regarding past errors, or to count errors which occur repeatedly on certain brake actuators 26.

An alternate sleeve 150 and alternate stone shield 152 which can be utilized in the brake monitoring system of FIGS. 1-14 are shown in FIG. 15. The sleeve 150 is generally identical to that shown in FIG. 8 in that it preferably comprises ferrite particles in a nylon 6,6 matrix. The sleeve 150 includes an inner wall 154 extending radially inwardly of the sleeve 150, forming an aperture 156. The sleeve 150 further includes a key 158 which is complementary to a keyway 160 in the stone shield 152. The difference in this sleeve 150 is the magnetization pattern. As shown by the graph in FIG. 15, the portion of the sleeve opposite the key 150 is magnetized according to the adjacent graph. As can be seen in the graph, the sleeve 150 includes a low level of magnetization at a lower axial end 162 and a high level of magnetization at an upper axial end 164. The level of magnetization between the lower and upper axial ends of the sleeve 150 increases continuously, and preferably linearly.

The stone shield includes a magnetic field sensor, preferably a hall effect device 166 positioned adjacent the magnetized portion of the sleeve 150 opposite the keyway 160. In the same manner described with respect to the embodiment shown in FIGS. 1–14, an RF transmitter 168 sends signals from the hall effect device 166. Hall effect devices are well known. Generally, the output of the hall effect device 166 depends upon the surrounding magnetic field intensity. The signal generated by the hall effect device 166 is therefore proportional to the position of the sleeve 150 and thus, the position of the push rod 50. It should be recognized that some signal conditioning circuitry may be required, such as analog to digital converters, etc. such that the RF transmitter 168 can send the signal generated by the hall effect device 166. The controller 28 will thus be able to determine the position of the push rod 28 and sleeve 150 with high accuracy and resolution.

Each of the conditions demonstrated in FIGS. 11–14 is associated with a signal generated by the hall effect device 166. Thus, the controller 28 could determine when points A, B, C or D are positioned adjacent the hall effect device 166, which correspond to the magnets 66, 68 and 70 of the sleeve 64 shown in FIG. 2. In addition, the controller 28 could determine an infinite number of positions between points A, B, C and D.

The controller 28 defines the zero stroke position when the hall effect device 166 detects the level of magnetic field at point A on the sleeve 150. The controller 28 determines a ⅝" stroke condition when the hall effect device 166 detects the level of magnetization at point B on the sleeve 150. The controller 28 determines a first overstroke condition when a level of magnetization at point C on sleeve 150 is detected by hall effect device 166. Further, the controller 28 can determine when the sleeve 150 is at a second overstroke position when the hall effect device 166 detects the level of magnetization at point D on sleeve 150. In combination with the other switch input conditions described above with respect to FIGS. 1–14, the variety of conditions and warnings can be generated by the controller 28. In addition, other conditions or errors may be determinable by the controller 28 utilizing the alternate sleeve 150 and alternate stone shield 152 shown in FIG. 15. In this manner, the controller 28 can determine an infinite number of positions of the sleeve 150 relative to the stone shield 152, as well as rate of movement, etc.

An alternate sleeve 170 and stone shield 172 which can detect an infinite number of positions of the sleeve 170 relative to the stone shield 172 is shown in FIG. 16. The sleeve 170 is secured to a push rod (not shown) in a manner identical to that described for previous embodiments. The sleeve 170 may comprise polyurethane, nylon 6,6 or other known materials. The sleeve 170 includes a wedge-shaped key 174 extending axially along the sleeve 170. The wedge-shaped key 174 has a first thickness at a first axial end and increases continuously, preferably linearly, and thickness to an axial second end. It should be noted that the sleeve 170 is shown rotated 180° relative to the stone shield for purposes of illustration.

The stone shield 172 includes a keyway 176 complementary to the key 174 on the sleeve 170. The keyway is generally wide enough to accommodate the widest portion of the key 174. However, a plunger 178 extends into the keyway 176 and is bias circumferentially by a spring 180. During operation, the key 174 is positioned in the keyway 176 adjacent the plunger 178. As the sleeve is inserted through the stone shield 172, the plunger 178 is displaced proportionally to the axial displacement of the sleeve. By measuring the circumferential displacement of the plunger 178, the axial displacement of the sleeve 170, and thus the corresponding push rod, can be determined.

One mechanism for measuring the displacement of the plunger 178 is shown in FIGS. 17 and 18. As shown, the plunger 178 includes a finger 182 which contacts a contact sensitive variable resistance strip 184. The variable resistance strip 184 is preferably waterproof and is generally known. Generally, the variable resistance strip 184 generates a signal proportional to the position of the finger 182 on the variable resistance strip 184. The signal from the variable resistance strip 184 is sent to the controller 28 (FIG. 1) as discussed above, preferably via an RF transmitter. As would be recognized by those skilled in the art, various conditioning circuitry may be required, such as an analog to digital converter, filters, etc. The sleeve 170 and stone shield 172 embodiment of FIGS. 16–18 provides a simple, durable means for determining the axial displacement of the sleeve 170 and push rod relative to the stone shield 172. The controller 28 (FIG. 1) determines each of the conditions illustrated in FIGS. 11–14, as well as an infinite number of positions therebetween. In this manner, the controller 28 can determine all of the conditions described in detail with respect to FIGS. 1–15.

The controller 28 has been described processing the data regarding the condition of the brake actuators in software utilizing a micro-controller 98, It should be recognized that combination logic or other hard-wired circuitry could also be utilized. It should also be recognized that infrared or other wireless communication means could be utilized in place of the RF transmitters, although RF is preferred.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle brake monitor, comprising:
   a brake actuator including a push rod which moves during actuation of said brake actuator having a sleeve;
   one of said brake actuator and said sleeve having a keyway and the other of said brake actuator and said sleeve having a key slideably received in said keyway fixing an orientation of said sleeve relative to said brake actuator as said push rod moves during actuation of said brake actuator; and
   a sensor mounted on one of said sleeve and said brake actuator detecting movement of said sleeve and said push rod relative to said brake actuator.

2. The vehicle brake monitor defined in claim 1, wherein said sensor is mounted on said brake actuator and said sleeve includes a magnet located opposite said sensor by said key and keyway.

3. The vehicle brake monitor defined in claim 1, wherein said sleeve is generally cylindrical and surrounds said push rod and said key is a radially projecting longitudinally extending key and said brake actuator having said keyway.

4. The vehicle brake monitor defined in claim 3, wherein said brake actuator includes an opening receiving said push rod and a stone shield surrounding said opening and said sleeve and said keyway located in said stone shield.

5. The vehicle brake monitor defined in claim 1, wherein said sleeve includes a magnet extending longitudinally relative to said push rod and said sensor is mounted on said brake actuator.

6. The vehicle brake monitor defined in claim 5, wherein said sensor is a hall effect device.

7. The vehicle brake monitor defined in claim 5, wherein said sensor is located in a stone shield in said brake actuator.

8. A vehicle brake monitor, comprising:
   a brake actuator including a push rod which moves during actuation of said brake actuator having a sleeve; and
   a hall effect sensor mounted on said brake actuator opposite said magnet generating a continuous signal indicating a displacement of said sleeve relative to said brake actuator;
   wherein one of said brake actuator and said sleeve has a keyway and the other of said brake actuator and said sleeve having a key slidably received in said keyway fixing an orientation of said magnet opposite said hall effect sensor as said push rod and sleeve move during actuation of said brake actuator.

9. The vehicle brake monitor defined in claim 8, wherein the external surface of said sleeve is generally cylindrical having a radially and longitudinally extending key and said brake actuator having a keyway slideably receiving said key on said sleeve.

10. The vehicle brake monitor defined in claim 8, wherein said sensor includes an RF transmitter transmitting a signal from said hall effect sensor.

* * * * *